(12) United States Patent
Chien et al.

(10) Patent No.: US 8,233,707 B2
(45) Date of Patent: *Jul. 31, 2012

(54) AUTOMATICALLY SELECTED ADJUSTERS

(75) Inventors: Jen-Chan Chien, Saratoga, CA (US); Joseph Ault, San Jose, CA (US); Scott Byer, Cupertino, CA (US); Marc Pawliger, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,718

(22) Filed: Apr. 4, 2011

(65) Prior Publication Data

US 2011/0182511 A1  Jul. 28, 2011

Related U.S. Application Data

(63) Continuation of application No. 11/639,108, filed on Dec. 13, 2006, now Pat. No. 7,920,739.

(51) Int. Cl.
*G06K 9/00* (2006.01)
*G06K 9/40* (2006.01)
*G03F 3/08* (2006.01)

(52) U.S. Cl. ............... 382/162; 382/274; 358/521

(58) Field of Classification Search ............... 382/162, 382/167, 254, 274, 275, 305, 311, 312; 345/354, 345/418, 427, 589, 593, 594, 600, 617, 673; 348/272, 577; 358/1.9, 500, 518, 520, 521; 715/209

See application file for complete search history.

(56) References Cited

U.S. PATENT DOCUMENTS

| | | | |
|---|---|---|---|
| 5,270,806 A | 12/1993 | Venable et al. | |
| 5,398,308 A | 3/1995 | Kato et al. | |
| 5,506,946 A | 4/1996 | Bar et al. | |
| 5,719,639 A | 2/1998 | Imamura | |
| 5,774,112 A | 6/1998 | Kasson | |
| 5,898,436 A | 4/1999 | Stewart et al. | |
| 6,711,293 B1 | 3/2004 | Lowe | |
| 6,724,935 B1 * | 4/2004 | Sawada et al. | 382/167 |
| 6,781,716 B1 * | 8/2004 | Yoda | 358/1.9 |
| 6,868,179 B2 * | 3/2005 | Gruzdev et al. | 382/167 |
| 6,915,021 B2 | 7/2005 | Cannata et al. | |
| 7,015,927 B2 * | 3/2006 | Matsushiro et al. | 345/600 |
| 7,177,465 B1 * | 2/2007 | Takahira | 382/166 |
| 7,190,487 B2 * | 3/2007 | Dalrymple et al. | 358/1.9 |
| 7,215,813 B2 * | 5/2007 | Graves et al. | 382/167 |
| 7,324,240 B2 * | 1/2008 | Ng | 358/1.9 |
| 7,358,976 B2 | 4/2008 | Hampshire et al. | |
| 7,359,086 B2 | 4/2008 | Kriss | |
| 7,593,603 B1 | 9/2009 | Wilensky | |

(Continued)

OTHER PUBLICATIONS

Gooch, et al., Color2Gray: Salience-Preserving Color Removal, <http:www.cs.northwestern.edu/~ago820/color2gray/> (cisited Feb. 22, 2007), 2 pages.

(Continued)

*Primary Examiner* — Kanjibhai Patel
(74) *Attorney, Agent, or Firm* — Robert C. Kowert; Meyertons, Hood, Kivlin, Kowert & Goetzel, P.C.

(57) ABSTRACT

Automatically selected adjusters are described, including selecting an area of an image, determining a characteristic of the area, and selecting an adjuster of a set of adjusters based on the characteristic of the area.

20 Claims, 8 Drawing Sheets

U.S. PATENT DOCUMENTS

| | | |
|---|---|---|
| 7,706,606 B1 | 4/2010 | Ruzon et al. |
| 2003/0161529 A1 | 8/2003 | Shimoyama |
| 2005/0069201 A1 | 3/2005 | Speigle et al. |
| 2006/0120599 A1 | 6/2006 | Steinberg et al. |
| 2007/0002153 A1 | 1/2007 | Dierickx |

OTHER PUBLICATIONS

Smith, Linday I., "A tutorial on Principal Components Analysis," Tutorial, Feb. 26, 2002, pp. 1-26.

Gooch, et al., "Color2Gray PCA Image Analysis and Projection," <http://www.cs.northwestern.edu/~ago820/color2gray/Color2GraySupplemental/Attempt1_PCA/pcsResults.html> (visited Feb. 22, 2007), 11 pages.

Gooch, et al., Color2Gray: Salience-Preserving Color Removal, <http:www.cs.northwestern.edu/~ago820/color2gray/color2gray.pdf>, 6 pages.

International Search Report for PCT/US 07/25462, mailed May 8, 2008, 9 pages.

U.S. Appl. No. 11/638,994, filed Dec. 13, 2006.

U.S. Appl. No. 11/638,781, filed Dec. 13, 2006.

Cordelia Schmid, et al., "Evaluation of Interest Point Detectors," International Journal of Computer Vision 37(2), pp. 151-172, copyright 2000 Kluwer Academic Publishers.

David G. Lower, "Local Feature View Clustering for 3D Object Recognition," Proc. of the IEEE Conference on Computer Vision and Pattern Recognition, Dec. 2001, 7 pages.

David G. Lower, "Distinctive Image Features from Scale-Invariant Keypoints," Accepted for publication in the International Journal of Computer Vision, 2004, 28 pages.

David G. Lower, "Object Recognition from Local Scale-Invariant Features," Proc. of the International Conference on Computer vision, Sep. 1999, 8 pages.

* cited by examiner

AUTOMATICALLY SELECTED ADJUSTERS

CROSS-REFERENCES TO RELATED APPLICATIONS

This is a continuation of U.S. patent application Ser. No. 11/639,108, filed Dec. 13, 2006 now U.S. Pat. No. 7,920,739, which is fully incorporated herein by reference. This application is related to U.S. patent application Ser. No. 11/638,781, filed on Dec. 13, 2006, and entitled "Automatic Image Adjustment."

FIELD OF THE INVENTION

The present invention relates generally to software. More specifically, automatically selected adjusters are described.

BACKGROUND OF THE INVENTION

Image editing software may be used to view and modify digital images. A digital image may be composed of one or more picture elements (pixels), each having color information. The color information of each pixel may be encoded as a red, green, and a blue component, each having an intensity value of between 0 and 255 for an eight-bit image, for example. According to other examples, the image may be a 16- or 32-bit image with corresponding intensity ranges. The combination of the three components creates an individual color pixel, and several pixels together create a digital image.

Image editing software may be used to perform various modifications to a digital image ("image"). For example, image editing software can be used to resize an image, alter colors of an image, change the brightness and other characteristics of an image, or modify selected portions of an image. The image editing software may include various palettes or dialogues with editing tools that may be used to effect these changes, including palettes or dialogues having adjusters to change color components for portions of an entire image.

Image editing software may also be used to convert a color image to a grayscale image. A brightness of each pixel of an image may be determined, for example by averaging the individual red, green, and blue components of a pixel. The brightness can then be applied to a black to white continuum to produce the gray pixel. However, such grayscale converted images often have flat contrast and indistinct shadows and highlights.

Thus, what is needed is image editing software without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, automatically selected adjusters are disclosed. A user may view or edit an image using an image editor such as image editing software. The user may generate a user input, such as a mouse click, to select an area of an image. An image may be a digital image including one or more picture elements (pixels), each having color and/or other information. An area of an image may be any portion of an image, such as a single pixel or a group of pixels. Once an area has been selected, a characteristic of the area may be determined. A characteristic of an area may be any quantifiable or describable property of the area, such as a color, intensity, brightness, or hue angle of the area. A property may be anything that is quantifiable or describable that may be used to describe the image or portions of the image. Once the characteristic of the area is determined, an adjuster from a set of adjusters may be selected. An adjuster may be an editing tool in an image editor that may be used to modify the image in some way. For example, an adjuster may be used to change a color balance, brightness, aspect ratio or other quality of an image. A set of adjusters may include, for example, adjusters for one or more colors across the color spectrum. An adjuster may be selected from the set of adjusters based on the characteristic of the area. According to an example, each adjuster in the set corresponds to a primary color. A primary color may be any color that may be controlled by one of the adjusters. The adjuster may be selected by determining which primary color has a range of hue angles to which the hue angle of the color of the area belongs. According to another example, grayscale conversions of color images may be improved using automatically-selected adjusters.

Automatically Selected Adjusters

Figure 1A:
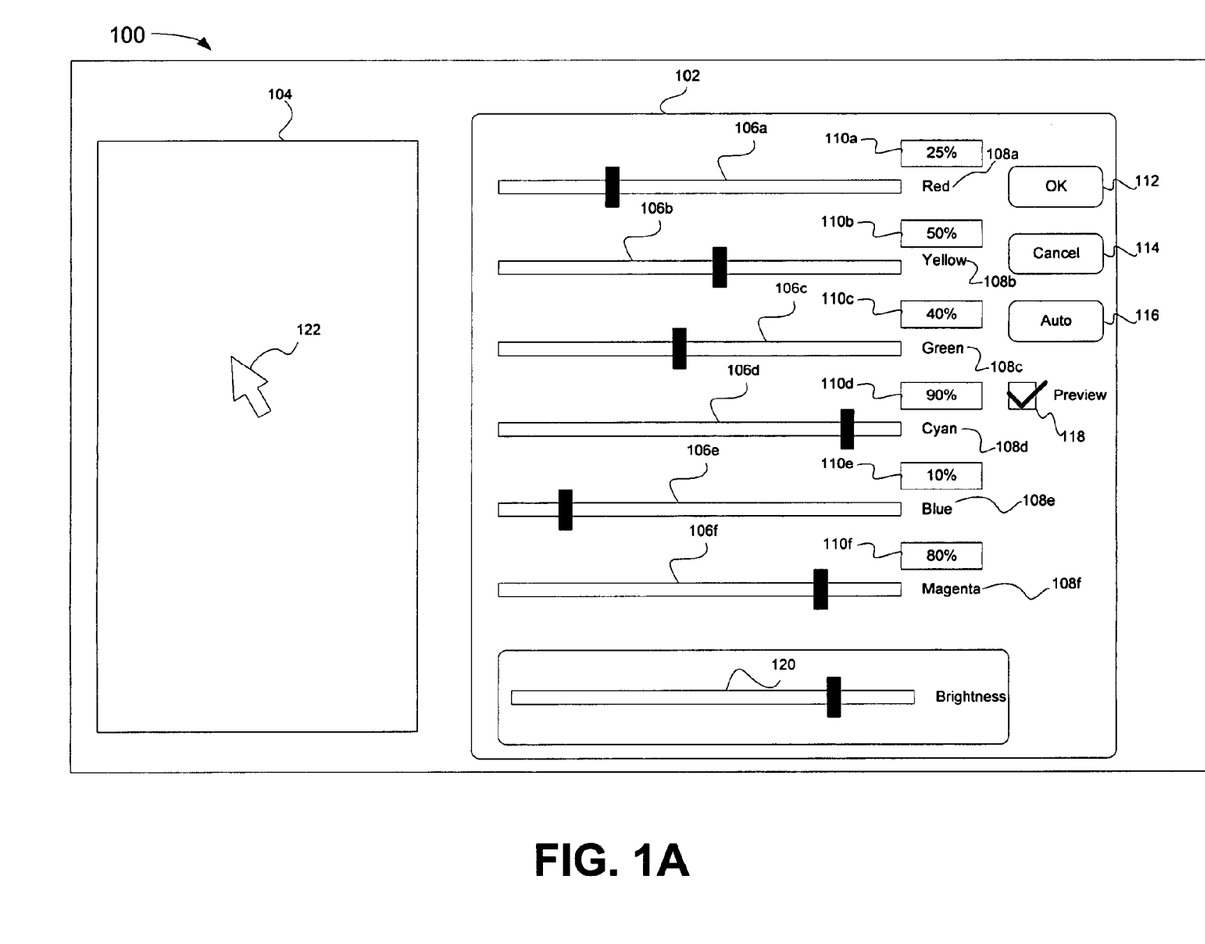
FIG. 1A illustrates an image editor including an adjustment palette according to various examples.

FIG. 1A illustrates an image editor 100 including an adjustment palette 102 according to various examples. The image editor 100 may be, for example, image editing software operating on an image 104. The adjustment palette 102 may be a graphical element used in the image editor 100 to present editing tools and graphs and other information and functions to a user. According to an example, the palette 102 may be a dialogue. The image 104 may be, for example, a bitmap image including one or more pixels arranged in a grid. Each of the pixels may include three color components, a red, a green, and a blue (RGB) component, for example. Each of the color components may have an intensity (for example, 0 to 255), and varying levels of intensity for each of the color components may be used to produce various colors. The image 104 may be any type of image, such as an eight-bit, sixteen-bit or 32-bit image. For example, pure red may be given as (255, 0, 0), while white is (255, 255, 255). Other types of images, such as vector images, and other types of color mixing, such as cyan, magenta, yellow, and black (CMYK), and hue, saturation, brightness (HSB), and others are also possible.

The adjustment palette 102 may operate on the image 104, and may include a set of adjusters 106 (e.g., six adjusters 106a-106f). The adjusters 106 shown here are sliders, but may also be implemented in a user interface to appear and function as dials, buttons, menus or any other type of interface mechanism. According to an example, the adjusters 106 may be used to change the intensity of the mix of primary colors within an image, where each adjuster is used to adjust the intensity of a primary color. The primary colors may be any colors, and the specific colors may be predetermined, for example by the image editor 100 or by a user. For example, the adjuster 106a may be used to adjust the red component of the image 104, the adjuster 106b may be used to adjust the yellow component of the image 104, the adjuster 106c may be used to adjust the green component of the image 104, the adjuster 106d may be used to adjust the cyan component of the image 104, the adjuster 106e may be used to adjust the blue component of the image 104, and the adjuster 106f may be used to adjust the magenta component of the image 104. An RGB or other type of image may be used with the set of adjusters 106. With an RGB image, the yellow, cyan, and magenta components of the image 104 may be adjusted by mixing the red, green, and blue components of the image 104 using interpolation, for example. According to other examples, there may be more or fewer adjusters 106. For example, there may be three adjusters 106 for red, green, and blue, or there may be eight adjusters, for red, green, blue, yellow, magenta, aquamarine, purple, and orange.

Each of the adjusters 106a-106f may also include a legend 108a-108f, respectively, which names the color the adjuster modifies and may also include a sample (e.g., a square) of the color. Additionally, each of the adjusters 106a-106f may have a corresponding percentage box 110a-110f, respectively, which reports the percentage intensity of each individual color component of the image 104. In some examples, the mix of the colors in the image 104 may be changed using the adjusters 106 or by entering a new percentage into the percentage boxes 110. According to an example, the percentage may exceed the bounds of 0 to 100%. For example, any percentage may be entered into the percentage boxes 110, such as −200% or 300%.

In some examples, the adjustment palette 102 may also include an OK button 112, a cancel button 114, an auto button 116, a preview checkbox 118, and a brightness adjuster 120. The OK button 112 may be selected to make the adjustments indicated in the adjusters 106 to the image 104 and close the adjustment palette 102. For example, a user may change the position of the adjusters 106, altering the color balance of the image 104, and may select the OK button 112 to make those changes to the image 104. The cancel button 114 may be selected to close the adjustment palette 102 without making any changes to the image 104. The preview checkbox 118 may be selected to preview the changes made using the adjusters 106 in the image 104. The preview checkbox 118 may be deselected to show the original image 104, before any changes were made using the adjusters 106. The brightness adjuster 120 may be used to make brightness adjustments in the image 104. For example, a change using the brightness adjuster may move each of the adjusters 102 substantially the same amount to change the overall intensity of the image 104.

The auto button 116 may be used to automatically select an adjustment to the image 104 that is reflected in the adjusters 106. The auto button 116 may use a principal component analysis (PCA), for example, to determine an automatic color mix for the primary colors for converting a color image to a grayscale image. Various techniques for determining the weights of each color are described in U.S. patent application Ser. No. 11/638,781, entitled "Automatic Image Adjustment," and filed on Dec. 13, 2006.

A user may use a pointer 122 to select an area of the image 104. The area may be, for example, a single pixel or a larger area. The pointer 122 may be a cursor that may be moved and controlled in response to a user input such as a mouse input. Alternatively, the area may be selected in response to the pointer 122 being moved, or the pointer 122 pausing or hovering near or over the area. According to various examples, a user may select an area of the image 104 that the user may wish to emphasize. For example, if a user is converting the image 104 from a color image to a grayscale image, the user may wish to change highlights and shadows of the image. The user may select an area that has high or low contrast, in order to emphasize or deemphasize that area. The area may have a certain color, for example. Each adjuster 106 may control a primary color, for example, red, yellow, or green. The user may select the area using the pointer 122, and the adjustment palette 102 may highlight the adjuster 106 that most closely corresponds to a color of the area chosen. For example, the color of the area may be closest (e.g., most similar) to green, so the green adjuster 106c may be highlighted when a user selects the area. After the adjuster 106c is selected, the adjuster 106c may be adjusted by the user. Selecting (and highlighting) the adjuster 106c allows a user to make adjustments to color ranges they have selected. The adjuster corresponding to the color of the area may automatically be selected to assist in image editing.

According to an example, using these techniques, a grayscale image may be modified without selecting and deselecting the preview checkbox 118. A user may wish to change the properties of a grayscale image by changing the color balance of a color image before actual grayscale conversion. The user could perform these modifications using the preview checkbox 118 since the color information may not be discarded until the user selects the OK button 112. A user may provisionally convert the image 104 to grayscale, and make adjustments to the image 104 while the image 104 is displayed in grayscale. Rather than deselecting the preview checkbox 118 to return to the color version of the image 104 to select desired areas of the image 104 to change the color mix, the user may select a desired area while still in grayscale, and the adjuster 106 similar to that area may be selected.

Figure 1B:
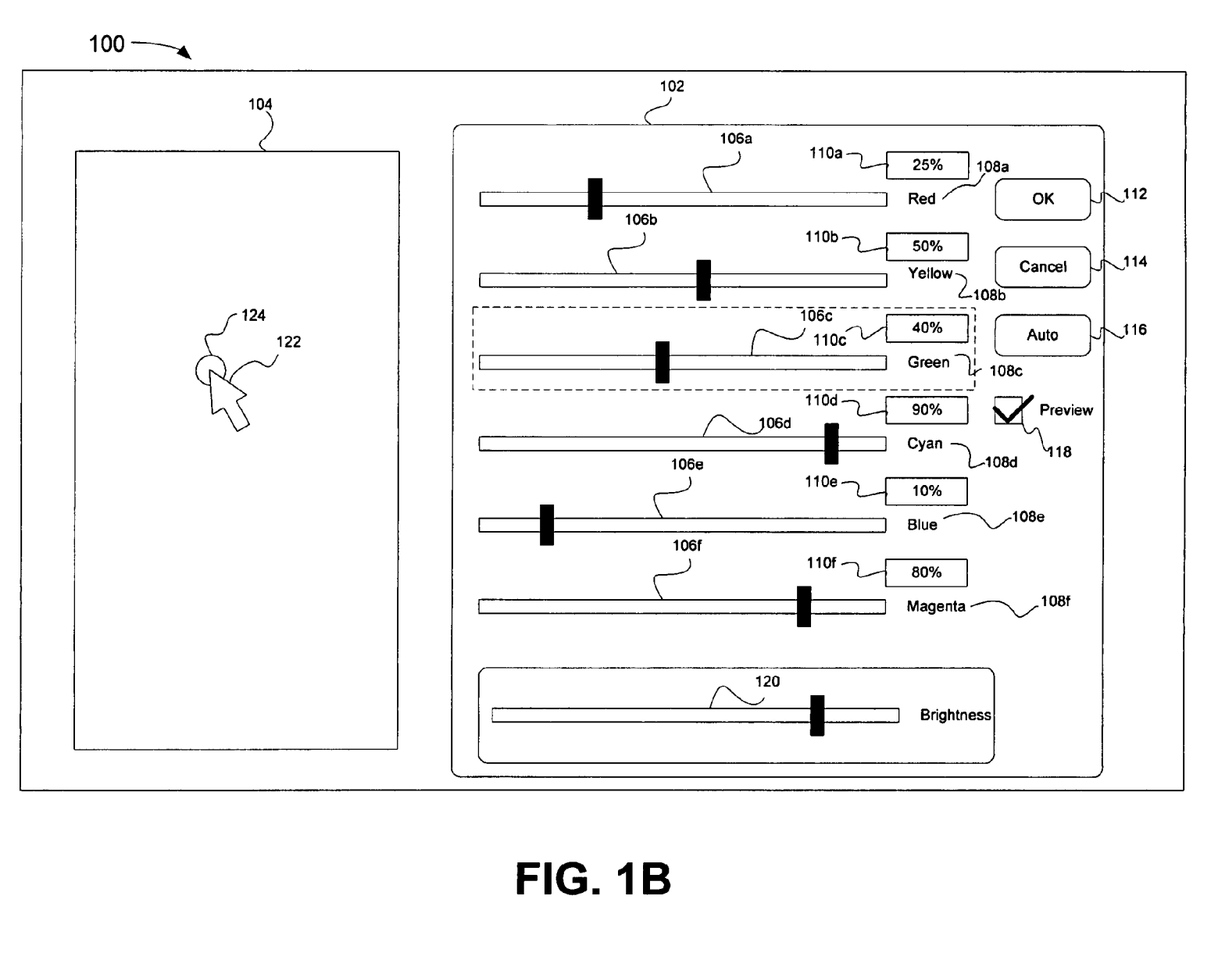
FIG. 1B illustrates selecting an adjuster of a set of adjusters in response to selecting an area of an image according to various examples.

FIG. 1B illustrates selecting an adjuster of the set of adjusters 106 in response to selecting an area of the image 104 according to various examples. One of the adjusters 106 may be selected when a user selects an area 124 of the image 104. The area 124 may be selected, for example, using the pointer, and the area 124 may be highlighted 126 (e.g., outlined) to emphasize the selection to the user. The area 124 may be selected in response to a user input (e.g., a mouse click or pointing and hovering), as described above. When the area 124 is selected, one of the adjusters 106 corresponding to a primary color closest to the color of the area 124 may be selected. For example, as shown here, the adjuster 106*c* for the color green is selected. The adjuster 106*c* may be highlighted 126, for example, to indicate to the user that the color of the area 124 corresponds to (i.e., within a color range of) the primary color green. Once the adjuster 106*c* has been selected, various techniques may be used to adjust the adjuster (see, e.g., FIG. 1C). Other techniques may be used to determine a color value for an area, such as non-linear weighting techniques.

The area 124 may be a single pixel or a larger area. The area 124 may have RGB values (e.g., R, G, B) to indicate the color of the area 124. If the area 124 is a pixel, the pixel may have its own RGB values. If the area 124 is larger than a pixel, the red, green, and blue values of the group of pixels in the area may be averaged to obtain an average RGB value for the area. For example, to obtain an average red value for the area, the red values of the pixels may be summed and divided by the number of pixels in the area.

Once the RGB value for the area is determined, a hue angle for the area may be determined. The hue angle is a value of a color that can be determined using a formula or using routines included with imaging software. Techniques for determining the hue angle of an area are described further regarding FIG. 2A. Once the hue angle is determined, it may be determined what primary color corresponds to the hue angle. For example, the color green may have a hue angle of 120°. According to an example, any area having a color with a hue angle between 91° and 150° would have green as its primary color. The adjuster 106*c* corresponding to green may then be selected, and the user may adjust the green component of the image.

According to other examples, a characteristic of an area of an image may be determined. For example, the characteristic may be color, hue, brightness, or saturation. A palette including various adjusters may be used with the image. The adjuster that adjusts a characteristic corresponding to (i.e., substantially similar to) that of the area may be selected when a user selects the area.

For example, a user may be converting a color image to a grayscale image. According to an example, a user may want to emphasize certain colors of the color image during the grayscale conversion. The image 104 may be provisionally converted to grayscale, the user may select an area to be adjusted, and the adjuster 106 closest to the color of the area may be selected. The user may the make adjustments using the selected adjuster 106 to change the appearance of the grayscale image.

Figure 1C:
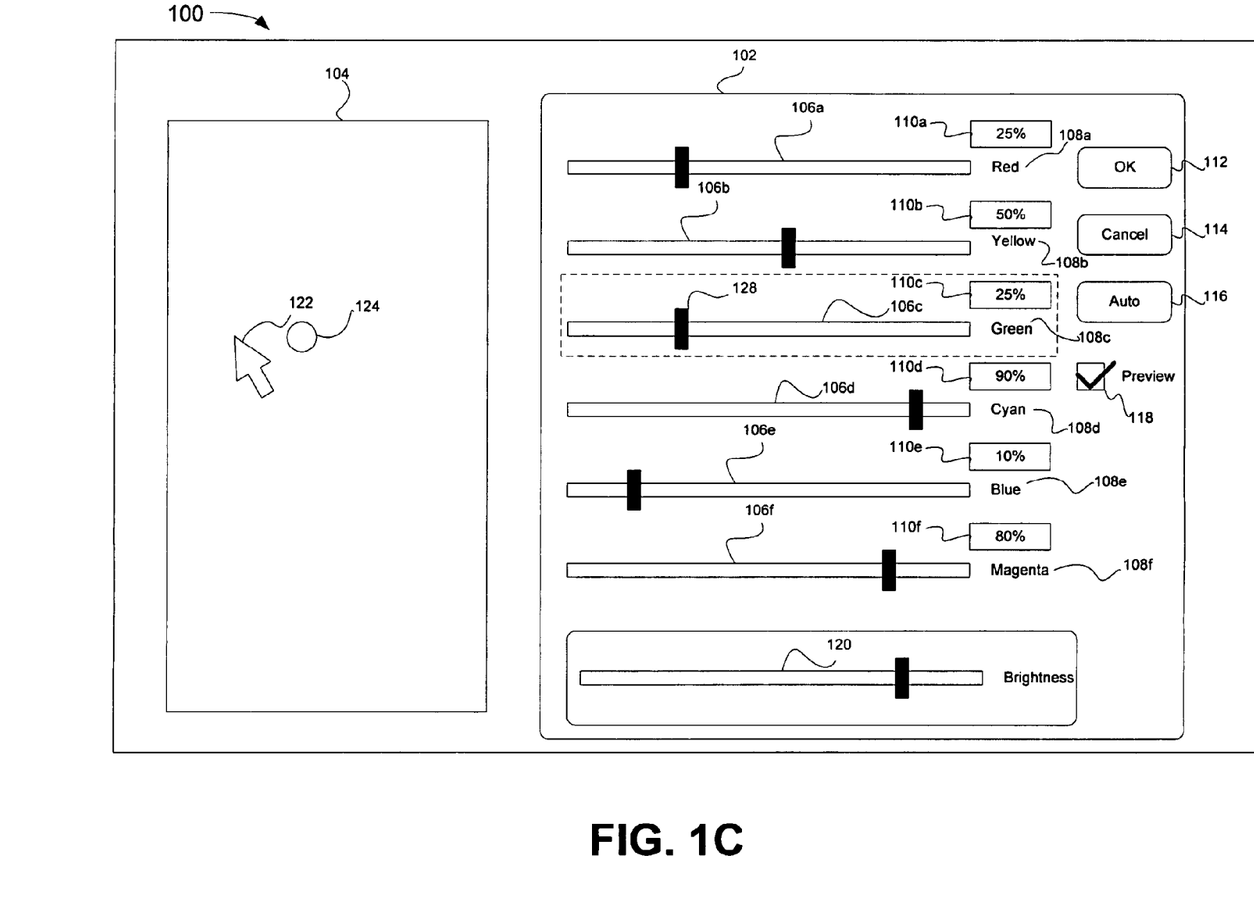
FIG. 1C illustrates adjusting an adjuster according to an example.

FIG. 1C illustrates adjusting the adjuster 106*c* according to an example. Various techniques may be used to adjust the adjuster 106*c* once it has been selected. For example, a user may move the pointer 122 over a slider bar 128 and drag the slider bar 128 along the slider to change the percentage of green in the image 104. The user may also manually change the percentage in the percentage box 110*c*. Alternatively, the user may use a mouse scrollwheel or keyboard arrows to move the slider bar 128.

According to another example, the user may move the pointer 122 relative to the area 124 after the area 124 has been selected. The user may move the pointer 122 left of the area 124 to reduce the percentage of the selected adjuster 106, or right to increase the percentage, for example. Additionally, moving the pointer 122 up or down relative to the area may be used to control another adjuster such as the brightness adjuster 120 or another of the adjusters 106. According to an example, the user may click the area 104, and maintain the click (i.e., click and drag) to continue adjusting the adjuster 106. When the user releases the click, the adjuster 106 may no longer be adjusted without using another adjustment technique or reselecting the area 124. According to another example, the user may release the click and continue to adjust the adjuster 106 by moving the pointer 122 left and right relative to the area 124. The user may click or perform another action to cease the adjustment using the pointer 122. Although the adjuster 106*c* has been described in some examples, it is understood that any of the adjusters 106 may be used with these examples.

According to another example, a user may select the area 124 by clicking on the area 124. The user may then move the pointer 122 about the image 104 to change the focus of the area 124 to different parts of the image 104. When the user moves the area 124, a different adjuster 106 may be selected if the area 124 has a color corresponding to a primary color different than those previously described.

Hue Angles to Determine Corresponding Primary Colors

Figure 2A:
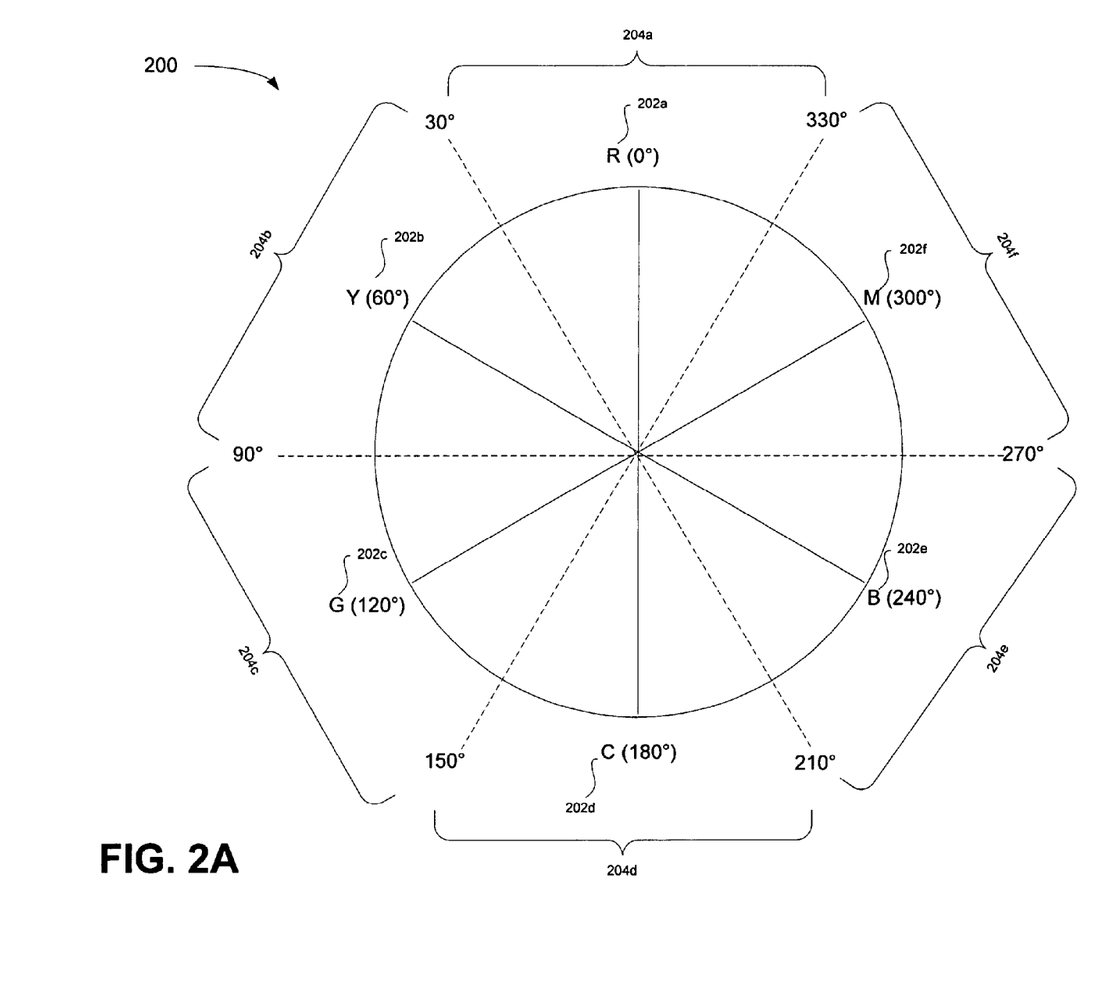
FIG. 2A illustrates a hue angle wheel according to an example.

FIG. 2A illustrates a hue angle wheel 200 according to an example. A hue of a color may refer to the color's position within a color spectrum. The hue angle wheel 200 shows the spectrum of color, beginning with the primary color red 202*a* at 0°. The colors continue around the hue angle wheel, until returning to red. The hue angle wheel 200 also shows the primary colors yellow 202*b* at 60°, green 202*c* at 120°, cyan 202*d* at 180°, blue 202*e* at 240°, and magenta 202*f* at 300°. These hue angles are examples of primary colors that may be adjusted. It is understood that any hue angle may be used for any of the colors 202. Additionally, it is understood that more or fewer colors may be used. A set of six primary colors are shown here to correspond to the six adjusters 106. In other examples, more or fewer primary colors and adjusters 106 may be used. The hue of a color may be described when the image 104 is in HSB space, for example. It is understood that any color space, including RGB or CMYK, may also be used.

A hue angle may be calculated for any color. For example, a hue angle may be calculated for a color represented by RGB values of an area using the following logic. As described above, a color may be described using the intensities of red, green, and blue components. Here, three values may be determined: max_value describes the component (e.g., red, green, or blue) that has the highest intensity, mid_value describes the component that has the middle intensity, and min_value describes the component that has the least intensity.

In some examples, if max_value is equal to min_value, the color is a gray (e.g., all color components have the same intensity), and the hue angle is undefined. If the hue angle is undefined, for example, the brightness adjuster 120 may be selected in response to a user selecting the area 124. Some tolerance may be used to determine whether max_value is equal to min_value. For example, the hue angle may be considered undefined if max_value is within a predetermined number of units of intensity of min_value. If max_value is equal to red, and mid_value is equal to green, the hue angle may be given by:

$$\theta = 60° \left( \frac{g-b}{max - min} \right)$$

where θ is the hue angle for the color, g is the green intensity value (e.g., 0 to 255), b is the blue intensity value, max is the intensity of the max_value component, and min is the intensity of the min_value component. If max_value is equal to red, and mid_value is equal to blue, then the hue angle of the color may be given by:

$$\theta = 60°\left(\frac{g-b}{\max-\min}\right) + 360°$$

If max_value is equal to green, then the hue angle of the color may be given by:

$$\theta = 60°\left(\frac{b-r}{\max-\min}\right) + 120°$$

where r is the intensity of the red component. If max_value is equal to blue, then the hue angle of the color may be given by:

$$\theta = 60°\left(\frac{r-g}{\max-\min}\right) + 240°$$

These equations assume that the hue angles of red, green, and blue are 0° (or 360°), 120°, and 240°, respectively. Some values of the equations may be adjusted to compensate for changes in the value of the hue angles of the primary colors.

As another example, a hue angle may be calculated using the following equation:

$$\theta = \arccos\left(\frac{0.5((r-g)+(r-b))}{\sqrt{((r-g)(r-g)+(r-b)(g-b))}}\right)$$

Where θ is the hue angle, and r, g, and b are normalized values of the RGB values of the color. For example, r, g, and b may be normalized by summing their values and setting the sum equal to one. Alternatively, the hue angle of a color may be determined using built-in functions of the image editor.

Once the hue angle of a color has been determined, the primary color corresponding to that color may be determined. Each primary color may have a range of hue angles 204, and the ranges 204 may overlap. If a hue angle of a color of an area belongs to one or more of the ranges, the primary color(s) of those ranges may correspond to the area. According to an example, if the color of the area has a hue angle in the range 204a between 331° and 30°, the primary color corresponding to the color of the area is red. If the hue angle is in the range 204b between 31° and 90°, the primary color corresponding to the color is yellow. If the hue angle is in the range 204c between 91° and 150°, the primary color corresponding to the color is green. If the hue angle is in the range 204d between 151° and 210°, the primary color corresponding to the color is cyan. If the hue angle is in the range 204e between 211° and 270°, the primary color corresponding to the color is blue. If the hue angle is in the range 204f between 271° and 330°, the primary color corresponding to the color is magenta. Generally, in this example, the primary color closest to a color of an area is within ±30° of the color of that area. If the hue angle is undefined (e.g., the color is gray), then the brightness adjuster 120 may be selected, or all of the adjusters 106 may be locked together (i.e., any adjustment made to one adjusts all), and selected.

Figure 2B:
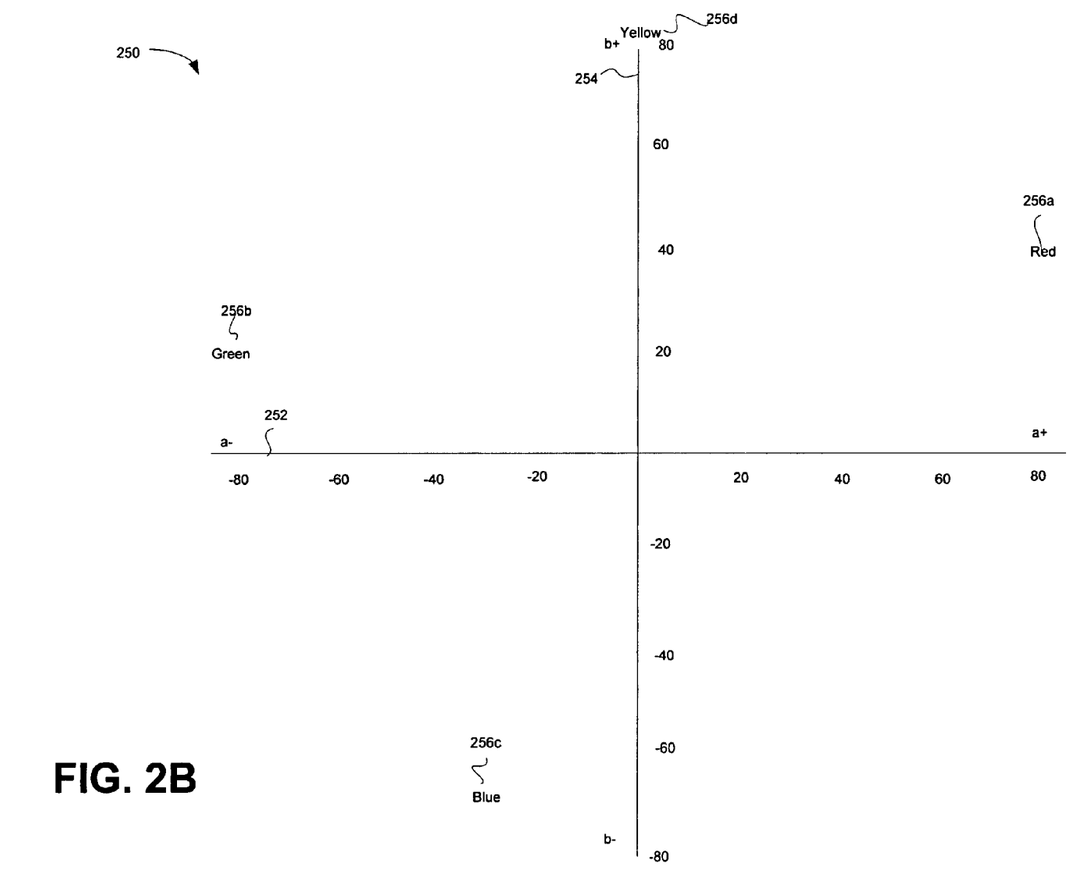
FIG. 2B illustrates an a*b* plane according to an example.

FIG. 2B illustrates an a*b* plane 250 according to an example. According to another embodiment, the image may be in a L*a*b* space, and the colors may be selected by choosing colors from within the a*b* plane 250. For example, an a* axis 252 may represent the mix of colors between magenta and green, and a b* axis 254 may represent the mix of colors between yellow and blue. A range of colors for determining the primary color using the a*b* plane 250 may include determining an area or radius around the primary color, for example. According to another embodiment, a primary color that is nearest (e.g., the shortest distance from) a color of an area may be selected. Some primary colors 256 are shown here. For example, red 256a may have coordinates of (40, 80), green 256b may have coordinates of (−80, 20), blue may have coordinates of (−30, −70), and yellow may have coordinates of (0, 90). According to an example, if a color of an area has coordinates of (70, 40), that color is closest to red, and red may be the corresponding primary color for the area.

According to other examples, any range of angles may be used to determine a primary color for an area. The range of hue angles for a primary color may be user or otherwise adjustable. For example, a user may specify that any area having a color falling within the range of 321° and 20° has a corresponding primary color of red. An image editor may include a user interface that allows the range of angles for a primary color to be adjustable. Additionally, more or fewer than six primary colors may be used with various examples. For example, other primary colors may include orange, aquamarine, and purple, which may have hue angles or be found within the a*b* plane. If more or fewer primary colors are used, more or fewer adjusters 106 may be used according to various examples. According to another example, more than one primary color may be specified for some hue angles. For example, if the hue angle of a color of an area is 330°, the primary color for that area may be both red and magenta. In this example, both the adjusters 106a and 106f may be highlighted, and they may alternatively be linked together so that both adjusters can be adjusted with a single action (e.g., as in FIG. 1C).

According to other examples, characteristics other than color may be used. For example, a palette may include adjusters to change the contrast, brightness, or saturation of an entire image or portion thereof. These characteristics may similarly be determined and a corresponding adjuster may be selected to assist a user when editing an image.

Determining a Primary Color for an Area

Figure 3:
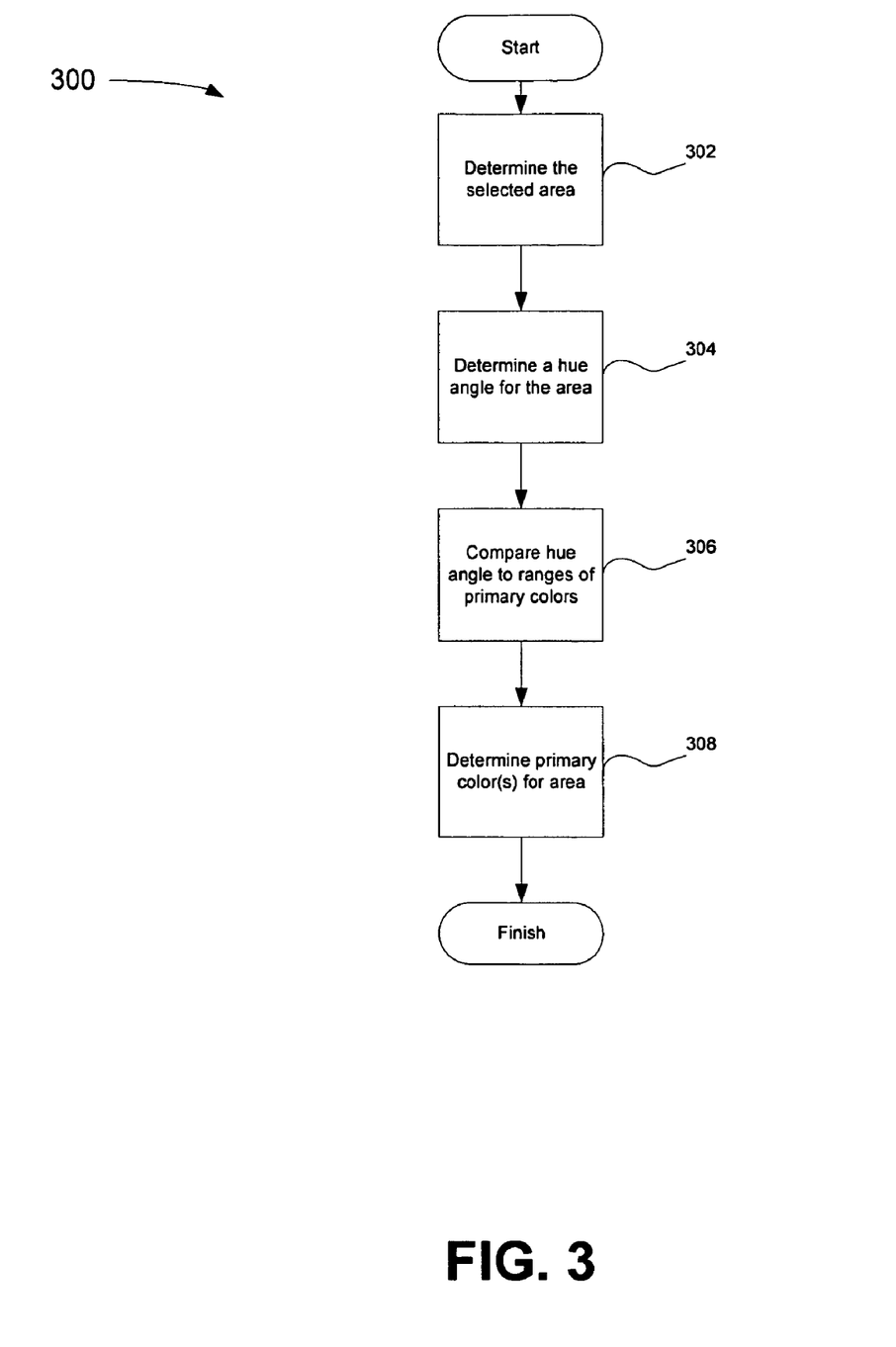
FIG. 3 is a flowchart describing a process for determining a primary color for an area of an image according to various examples.

FIG. 3 is a flowchart describing a process 300 for determining a primary color for an area of an image according to various examples. The primary color may be used to determine an adjuster (e.g., one of the adjusters 106) to select when a user selects an area. In some examples, more than one primary color may be selected.

In operation 302, a selected area is determined. The area may be selected in response to a user input, for example a mouse click. The selected area may be indicated on a display by surrounding the area, for example with a circle. The area may be a pixel or a larger area. If the area is larger than a pixel, RGB values for the area may be determined by averaging the RGB values the group of pixels within the area. Additionally, other weighting techniques, such as center weighting or using a median may also be implemented.

In operation 304, a hue angle for the area is determined. The hue angle may be determined using one of several techniques. For example, the hue angle may be determined by using a routine of the imaging editor or by using the techniques described above.

In operation 306, the hue angle of the color of the area is compared to ranges of hue angles of primary colors. The ranges may be determined by the imaging editor, or may be selected by a user. Once the hue angle of the area is found to be within a range, one or more primary colors corresponding to the color of the area are determined in operation 308. The primary color(s) determined here may be used with the process 400 as described regarding FIG. 4.

Process for Automatically Selecting an Adjuster

Figure 4:
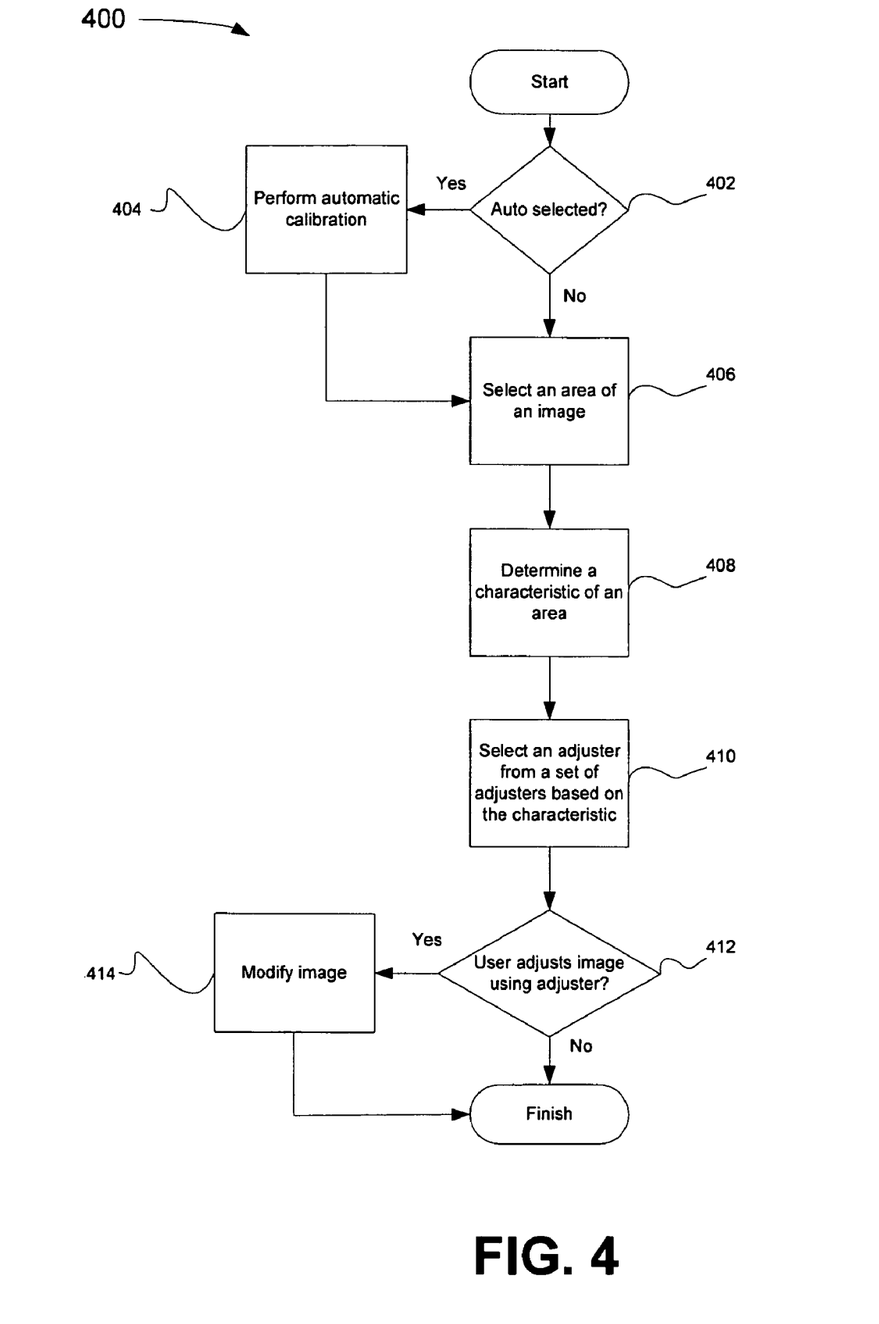
FIG. 4 is a flowchart describing a process for selecting an adjuster based on a characteristic of an area of an image according to various examples.

FIG. 4 is a flowchart describing a process 400 for selecting an adjuster based on a characteristic of an area of an image according to various examples. According to an example, a characteristic of an area may be any quantifiable or describable property that may be correspond to one or more adjusters. For example, a set of adjusters for a set of primary colors may be used to adjust intensities of various colors within an image.

If a user is creating a grayscale image from a color image, the user may select the auto button (e.g., the auto button 116) in operation 402 to perform an automatic calibration of the adjusters 106. The process 400 may then select percentages for each of the colors represented by the adjusters to perform the automatic calibration in operation 404. As described above, the percentages may be based on a PCA or other formulas and analytical techniques. Additionally, a preview of the image may be shown in grayscale to assist the user.

In operation 406, an area of an image is selected. The area may be selected in response to a user input, for example. The area may include one or more pixels. As used here, selecting an area may include highlighting (e.g. outlining) the area in response to a mouse click or other selection technique.

In operation 408, a characteristic of the area is determined. The characteristic may be a color or other characteristic, for example. If the characteristic is a color, and the area is a pixel, the color of the pixel may be the characteristic. According to an example, the color may be expressed as a hue angle. If the area is more than one pixel, the individual characteristics (e.g., colors) of the pixels may be averaged to determine the characteristic for the area.

In operation 410, an adjuster of a set of adjusters is selected based on the characteristic. The set of adjusters may include adjusters to change intensities of color components of the image. Individual adjusters of the set may correspond to a predetermined primary color, for example, red, green, or blue. For example, the adjuster may be selected because a hue angle of the color (i.e., the characteristic) of the area belongs to a range of hue angles assigned to a primary color of the adjuster. The primary color for a hue angle may be determined as described in the process 300 of FIG. 3, for example.

Additionally, the user may adjust the image using the adjuster in operation 412, for example by moving a pointer relative to the area, using a scroll wheel, or using a keyboard. If the user has made such an adjustment, in operation 414, the image is modified accordingly.

An Exemplary Computer System

Figure 5:
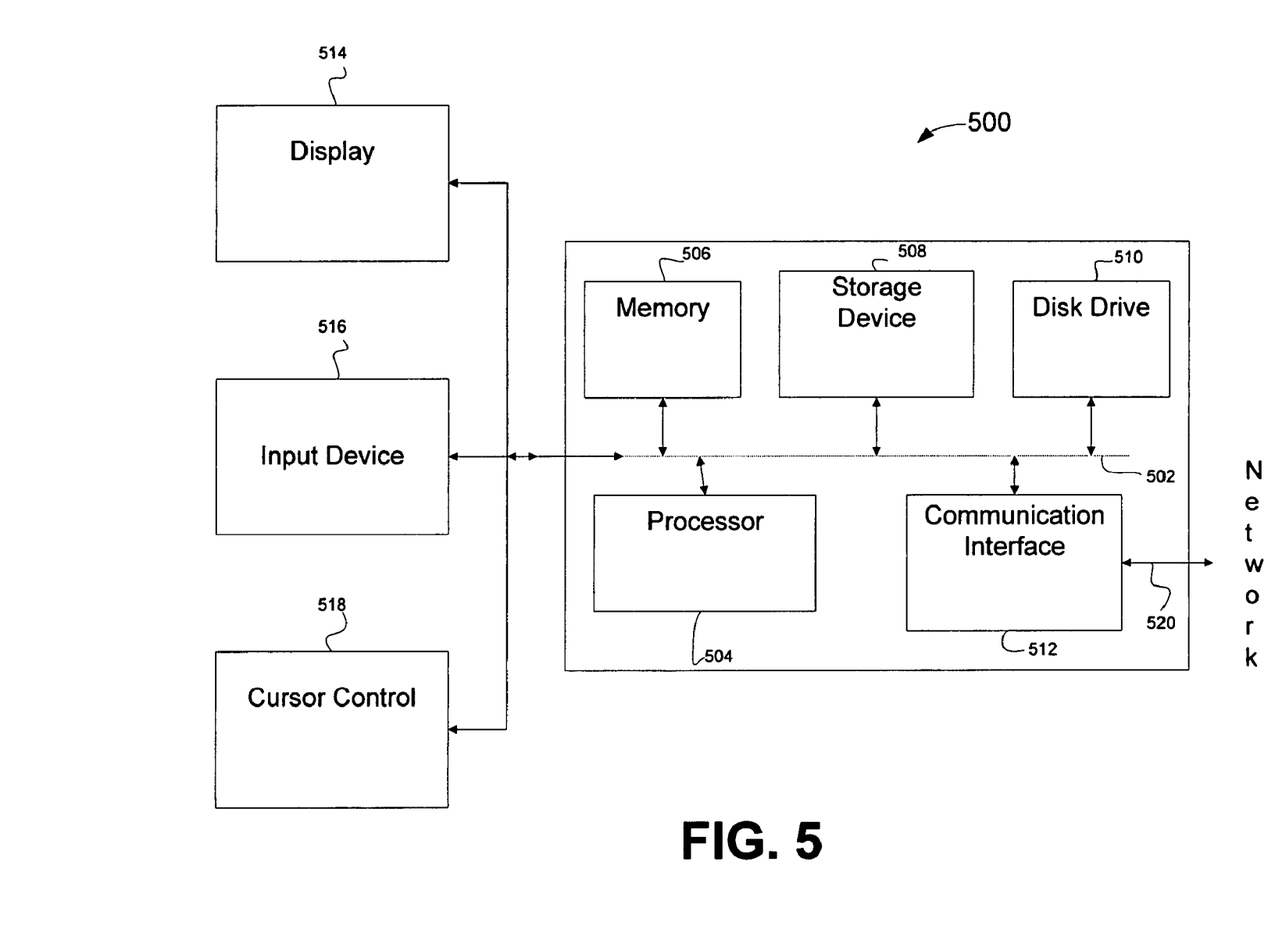
FIG. 5 is a block diagram illustrating an exemplary computer system suitable for implementing automatically selected adjusters, in accordance with various examples.

FIG. 5 is a block diagram illustrating an exemplary computer system suitable for implementing automatically selected adjusters, in accordance with various examples. In some examples, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some examples, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed is:

1. A method, comprising:
displaying a grayscale rendering of a color image;
receiving input to the displayed grayscale rendering to select an area of the grayscale rendering of the color image;
determining a color characteristic of an area of the color image in response to the receiving the input to the displayed grayscale rendering,
    wherein the area of the color image corresponds to the selected area of the grayscale rendering; and
selecting an adjuster from a plurality of adjusters based on the color characteristic of the area of the color image,
    wherein each adjuster in the plurality of adjusters is capable of accepting adjusting input to adjust the grayscale rendering based on a corresponding characteristic of the color image.

2. The method of claim 1, further comprising:
receiving adjusting input to the adjuster; and
in response to the receiving the adjusting input, changing the grayscale rendering of the color image to reflect the adjusting input.

3. The method of claim 1,
wherein the adjuster adjusts a characteristic of the grayscale rendering that is not based on color.

4. The method of claim 3,
wherein the characteristic is one of brightness or intensity.

5. The method of claim 1, further comprising:
selecting all adjusters of the plurality of adjusters; and
locking together all adjusters,
    wherein the locking together comprises applying an adjustment made to any adjuster of the plurality of adjusters to all adjusters.

6. The method of claim 1, further comprising:
selecting a subset of adjusters of the plurality of adjusters,
    wherein the adjuster is one of the subset of adjusters; and
locking together every adjuster of the subset of adjusters,
    wherein the locking together comprises applying an adjustment made to any adjuster of the subset of adjusters to every adjuster of the subset of adjusters.

7. The method of claim 1,
wherein the determining a color characteristic comprises determining a hue angle for a color of the area of the color image.

8. The method of claim 7, further comprising:
determining a range of hue angles within which the hue angle lies,
    wherein the range of hue angles is one of a plurality of ranges of hue angles, and
    wherein the selecting the adjuster is further based on the determining the range of hue angles within which the hue angle lies.

9. The method of claim 8,
wherein a range of the range of hue angles is adjustable by a user.

10. The method of claim 8,
wherein the range of hue angles overlaps with another of the plurality of ranges of hue angles.

11. The method of claim 8,
wherein the area of the image comprises a group of pixels, and
wherein the determining the hue angle comprises applying a function to color characteristics of the group of pixels.

12. The method of claim 11,
wherein the function is one of a non-linear weighting, a center weighting, or a median.

13. The method of claim 8,
wherein each of the plurality of ranges of hue angles corresponds to one of the plurality of adjusters.

14. The method of claim 8,
wherein if the hue angle is undefined, the adjuster allows a user to adjust brightness or intensity.

15. A non-transitory computer-readable storage medium storing program instructions, wherein when the program instructions are executed, the program instructions perform a method comprising:
displaying a grayscale rendering of a color image;
receiving input to the displayed grayscale rendering to select an area of the grayscale rendering of the color image;
determining a color characteristic of an area of the color image in response to the receiving the input to the displayed grayscale rendering,
wherein the area of the color image corresponds to the selected area of the grayscale rendering; and
selecting an adjuster from a plurality of adjusters based on the color characteristic of the area of the color image,
wherein each adjuster in the plurality of adjusters is capable of accepting adjusting input to adjust the grayscale rendering based on a corresponding characteristic of the color image.

16. The non-transitory computer-readable storage medium of claim 15,
wherein the determining a color characteristic comprises determining a hue angle for a color of the area of the color image.

17. The non-transitory computer-readable storage medium of claim 16, further comprising:
determining a range of hue angles within which the hue angle lies,
wherein the range of hue angles is one of a plurality of ranges of hue angles, and
wherein the selecting the adjuster is further based on the determining the range of hue angles within which the hue angle lies.

18. A system comprising:
one or more processors; and
a memory coupled to one of the one or more processors, wherein the memory stores program instructions, wherein when the program instructions are executed, the program instructions perform a method comprising:
displaying a grayscale rendering of a color image;
receiving input to the displayed grayscale rendering to select an area of the grayscale rendering of the color image;
determining a color characteristic of an area of the color image in response to the receiving the input to the displayed grayscale rendering,
wherein the area of the color image corresponds to the selected area of the grayscale rendering; and
selecting an adjuster from a plurality of adjusters based on the color characteristic of the area of the color image,
wherein each adjuster in the plurality of adjusters is capable of accepting adjusting input to adjust the grayscale rendering based on a corresponding characteristic of the color image.

19. The system of claim 18,
wherein the determining a color characteristic comprises determining a hue angle for a color of the area of the color image.

20. The system of claim 19, further comprising:
determining a range of hue angles within which the hue angle lies,
wherein the range of hue angles is one of a plurality of ranges of hue angles, and
wherein the selecting the adjuster is further based on the determining the range of hue angles within which the hue angle lies.

* * * * *